United States Patent [19]

Iijima et al.

[11] Patent Number: 4,987,040
[45] Date of Patent: Jan. 22, 1991

[54] MAGNETIC RECORDING MEDIUM FOR DISPLACEMENT DETECTORS

[75] Inventors: Kenzaburou Iijima; Yoshinori Hayashi; Seiya Nishimura, all of Shizuoka, Japan

[73] Assignee: Yamaha Corporation, Japan

[21] Appl. No.: 243,680

[22] Filed: Sep. 13, 1988

[30] Foreign Application Priority Data

Sep. 16, 1987 [JP] Japan .................. 62-231702

[51] Int. Cl.$^5$ ............................... G11B 7/00
[52] U.S. Cl. ............................ 428/694; 324/207.21; 324/207.22; 324/207.23; 324/252; 341/15
[58] Field of Search ............. 324/200, 252, 207, 208, 324/207.2, 207.21, 207.24, 207.25, 207.23, 207.22; 341/15; 235/493; 428/694

[56] References Cited

U.S. PATENT DOCUMENTS

| | | | |
|---|---|---|---|
| 4,274,053 | 6/1981 | Ito et al. | 324/207.21 |
| 4,319,188 | 3/1982 | Ito et al. | 324/207.21 |
| 4,523,304 | 6/1985 | Satoh et al. | 369/98 |
| 4,529,934 | 7/1985 | Heinrich | 324/207.25 |
| 4,551,676 | 11/1985 | Amemiya et al. | 324/207.21 |
| 4,599,561 | 7/1986 | Takahashi et al. | 324/252 |
| 4,672,317 | 6/1987 | Indo | 324/207.12 |
| 4,677,377 | 6/1987 | Takahashi et al. | 24/207.12 |
| 4,695,795 | 9/1987 | Nakazimo et al. | 324/207.25 |
| 4,713,613 | 12/1987 | Takahashi et al. | 324/207.22 |
| 4,746,862 | 5/1988 | Ucki | 324/207.25 |
| 4,764,767 | 8/1988 | Ichikawa et al. | 324/207.25 |
| 4,774,464 | 9/1988 | Kubota et al. | 324/207.25 |
| 4,785,241 | 11/1988 | Abiko et al. | 324/207.21 |
| 4,851,771 | 7/1989 | Ikeda et al. | 324/207.21 |
| 4,866,382 | 9/1989 | Carmen | 324/207.21 |
| 4,870,358 | 9/1989 | Glaize et al. | 324/207.22 |
| 4,904,937 | 2/1990 | Takahashi et al. | 324/207.25 |

Primary Examiner—George F. Lesmes
Assistant Examiner—Dennis Carmen

[57] ABSTRACT

In constructoin of a magnetic recording medium provided with one circular track for magnetic graduations and another circular track for standard marks, the standard marks are accompanied with specified magnetic identification marks so that discrimination between the standard marks can be fairly done without any influence by the number of the standard marks only by reading them out together with the identification marks. The medium is advantageously used for displacement detectors such as magnetic rotary encoders and magnetic linear scales.

9 Claims, 1 Drawing Sheet

MAGNETIC RECORDING MEDIUM FOR DISPLACEMENT DETECTORS

BACKGROUND OF THE INVENTION

The present invention relates to an improved magnetic recording medium for displacement detectors, and more particularly relates to an improvement in a magnetic recording medium for displacement detectors such as magnetic rotary encoders or magnetic linear scales which detect the amount of an angular or linear displacement of a mobile object.

In a magnetic rotary encoder, a typical magnetic recording medium, used for industrial devices such as robots, is a magnetic disc which rotates with a mobile object. Such a magnetic disc is generally provided with a ferromagnetic material attached on its surface or made of a ferromagnetic material. Graduations spaced at constant interval and one or more standard marks are magnetically written in the surface of the magnetic disc. One or more magnetic resistor elements are arranged facing the graduations and the standard mark or marks and generate output signals in response to the graduations and the standard mark or marks in order to provide information regarding the rotation angle, i.e. the total amount of rotation, of the mobile object.

There is a type of encoder which includes a plurality of standard marks and necessitates discrimination between different standard marks. The following method is conventionally employed in order to effect such a discrimination.

A magnetic disc of such an encoder generally includes two concentrically formed magnetized tracks. The outer magnetized track includes a number of juxtaposed magnetic graduations whereas the inner magnetized track includes, for example, four magnetic standard marks circumferentially spaced from each other at equal intervals. Each graduation is written in in the form of a relatively long pulse having a width "T" and each standard mark is written in the form of a relatively short pulse having a width "t". The first standard mark is located at the rising position of one graduation, the second standard mark is located at a position 90° out of phase from the first standard mark, the third standard mark is located at a position 180° out of phase and the fourth standard mark is located at a position 270° out of phase from the first standard mark. With this construction, the above-described discrimination of each standard mark can be carried out by detecting the phase-difference between the specified graduation and the standard mark.

In order to successfully practice the above-described discrimination, the following relationship must exist between the pulse widths "T" and "t":

$$0 < t < 2T/n \qquad (1)$$

From this relationship, it is clear that an increase in the number "n" of standard marks necessitates a corresponding decrease in pulse width "t" of the standard marks. Such a decrease in pulse width renders the writing-in operation very difficult. In addition, the standard marks and the graduations both have to be read out for the discrimination.

SUMMARY OF THE INVENTION

It is the object of the present invention to enable easy writing-in of magnetic standard marks and successful discrimination of the standard marks without any influence by their number.

In accordance with the basic aspect of the present invention, each standard mark on an magnetic recording medium is accompanied with identification marks written-in in its vicinity.

DESCRIPTION OF THE PREFERRED EMBODIMENTS

Figure 1:
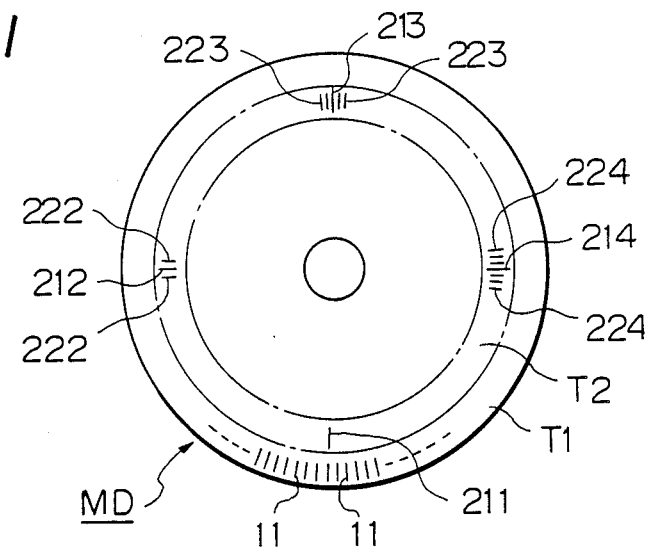
FIG. 1 is a plan view of one embodiment of the magnetic recording medium used for a displacement detector in accordance with the present invention.

One embodiment of the magnetic recording medium in accordance with the present invention is shown in FIG. 1 in the form of a magnetic disc MD for a magnetic rotary encoder. The magnetic disc MD includes two concentrically formed magnetized tracks T1 and T2. The outer magnetized track T1 includes a number of juxtaposed magnetic graduations 11 whereas the inner magnetized track T2 includes four magnetic standard marks 211 to 214 circumferentially spaced from each other at 90° intervals. As in the conventional encoder, each graduations 11 is magnetically written in in the form of a relatively long pulse of a width "T" and each standard mark is written in in the form of a relatively short pulse of a width "t". The first standard mark 211 is written in at the rising position of one graduation 11.

The second standard mark 212 is accompanied with a pair of magnetic identification marks 222 written in the track T2 on both sides thereof, the third standard mark 213 is accompanied with two pairs of magnetic identification marks 223 written in the track T2 on both sides thereof, and the fourth standard mark 214 is accompanied with three pairs of magnetic identification marks 224 written in the track T2 on both sides thereof. In the case of this example, the first standard mark 211 is accompanied with no magnetic identification marks.

With the above-described construction of the magnetic disc MD, the standard marks 211 to 214 can be easily discriminated from each other by reading them out together with the accompanying identification marks 222 to 224.

Although the two magnetized tracks T1 and T2 are formed on the same surface side of the magnetic disc MD in the above-described embodiment, different magnetized tracks T1 and T2 may be formed on different surface sides of the magnetic disc with a proper diametral lag.

Figure 2:
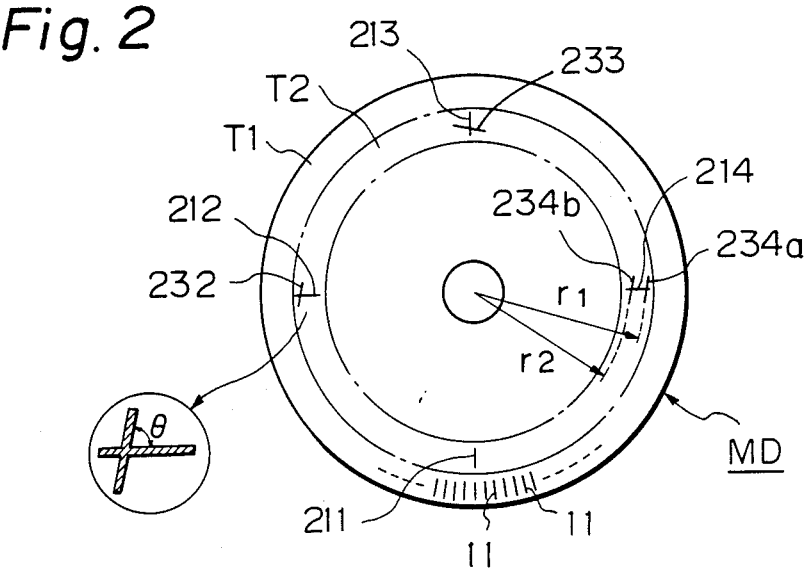
FIG. 2 is a plan view of another embodiment of the magnetic recording medium used for a displacement detector in accordance with the present invention.

Another embodiment of the magnetic recording medium in accordance with the present invention is shown in FIG. 2 again in the form of a magnetic disc MD for a magnetic rotary encoder. This magnetic disc MD is different from that in FIG. 1 in the disposition of magnetic identification marks. More specifically, as in foregoing embodiment, the first standard mark 211 is not accompanied by any identification marks. The second standard mark 212 is accompanied with an identification mark 232 crossing therewith at a cross angle θ, the third standard mark 213 is accompanied with an identification mark 233 crossing therewith at the cross angle θ, and the fourth standard mark 214 is accompanied with two identification marks 234a and 234b crossing therewith at the cross angle θ. The identification mark 232 for the second standard mark 212 and the identification mark 234a for the fourth standard mark 214 are located on a common imaginary circle of an "r1" radius. Whereas the identification mark 233 for the third standard mark 213 and the identification mark 234b for the fourth standard mark 214 are located on a common imaginary circle of an "r2" radius which is smaller than the radius "r1".

With this construction, the standard marks 211 to 214 can be easily discriminated as shown in the following Table by reading them out together with the accompanying identification marks.

|  |  |  |  |  |
|---|---|---|---|---|
| r1 | 0 | 1 | 0 | 1 |
| r2 | 0 | 0 | 1 | 1 |
| standard mark | 211 | 212 | 213 | 214 |

Note: "0" indicates no detection of the identification mark and "1" indicates detection of the identification mark.

Needless to say, the present invention an is well applicable to a magnetic recording medium provided with more than four standard marks.

In the case of the present invention, only the following relationship is required to exist between the pulse widths "T" and "t".

$$T \leq t < 2T \quad (2)$$

When compared with the foregoing relationship (1) for the conventional magnetic recording medium, it is clear that the pulse width "t" of the standard marks is fully released from the shackle of its number "n".

In accordance with the present invention an, increase in number "n" of standard marks does not require any corresponding decrease in their pulse width "t". As a consequence, magnetic standard marks can be written in very easily. Further, the standard marks can be successfully discriminated without any influence by their number.

The present invention is in particular advantageously used for matching between the rotor phase and the encoder phase in an AC servo system.

We claim:

1. An improved magnetic recording medium for displacement detectors said recording medium comprising
   a first magnetized track including a number of juxtaposed magnetic graduations; and
   a second magnetized track having a plurality of magnetic standard marks spaced from each other at constant intervals and magnetic identification marks in said second track which uniquely identify said standard marks and discriminate said standard marks from one another.

2. An improved magnetic recording medium as claimed in claim 1 in which each said
   standard mark is accompanied by a different number of said identification marks.

3. An improved magnetic recording medium as claimed in claim 2 in which said first and second tracks are formed on a same surface of said medium.

4. An improved magnetic recording medium as claimed in claim 2 in which said first and second tracks are formed on different surfaces of said medium.

5. An improved magnetic recording medium as claimed in claim 1 in which each said identification mark crosses a respective standard mark the number and/or location of said identification marks crossing each respective standard mark being different for each standard mark.

6. An improved magnetic recording medium as claimed in claim 5 in which said first and second tracks are formed on a same surface of said medium.

7. An improved magnetic recording medium as claimed in claim 5 in which said first and second tracks are formed on different surfaces of said medium.

8. An improved magnetic recording medium as claimed in claim 1 in which
   said first and second tracks are formed on a same surface of said medium.

9. An improved magnetic recording medium as claimed in claim 1 in which
   said first and second tracks are formed on different surfaces of said medium.

* * * * *